April 27, 1965   R. D. LAMBERT   3,179,968
POWER-OPERATED LOADING RAMP
Filed Aug. 20, 1962   7 Sheets-Sheet 3
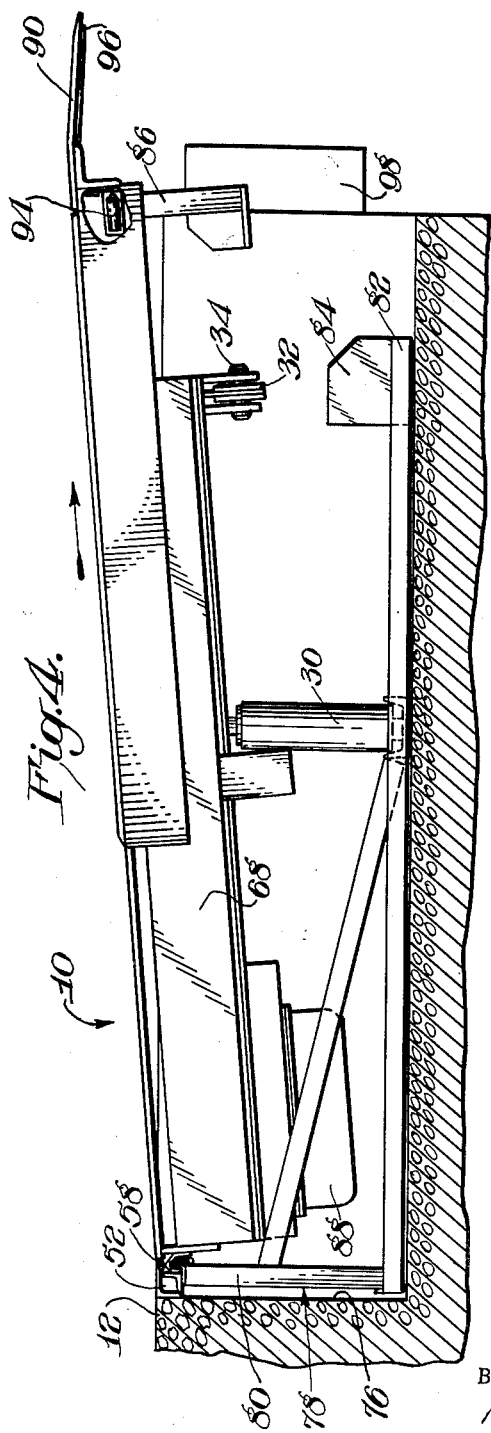
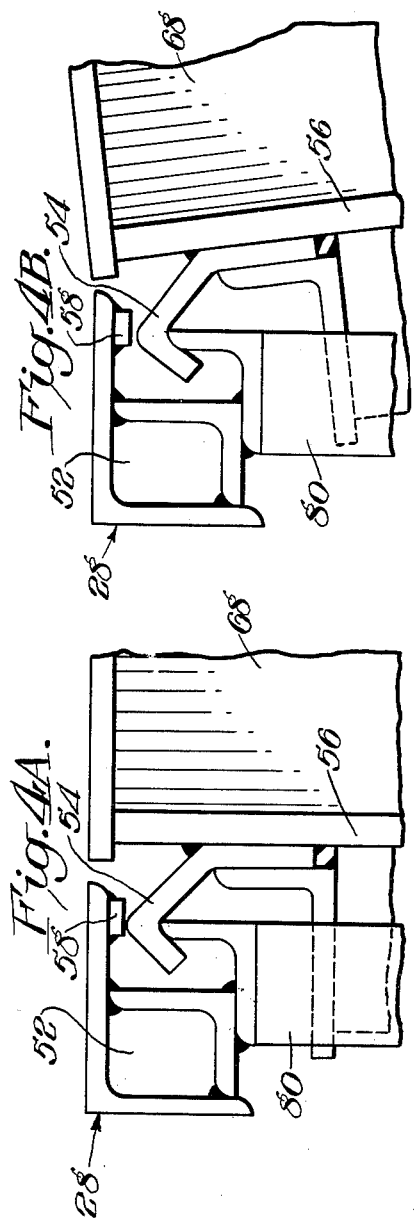
INVENTOR
Robert D. Lambert
BY Connolly and Hutz
ATTORNEYS April 27, 1965 R. D. LAMBERT 3,179,968
POWER-OPERATED LOADING RAMP
Filed Aug. 20, 1962 7 Sheets-Sheet 4
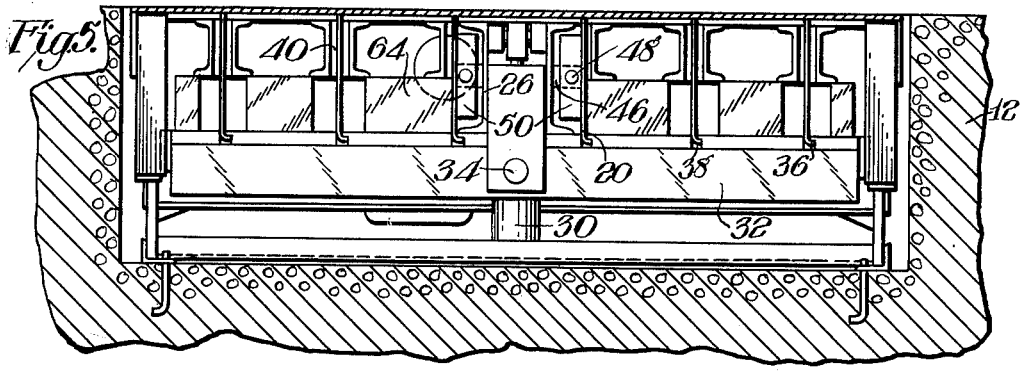
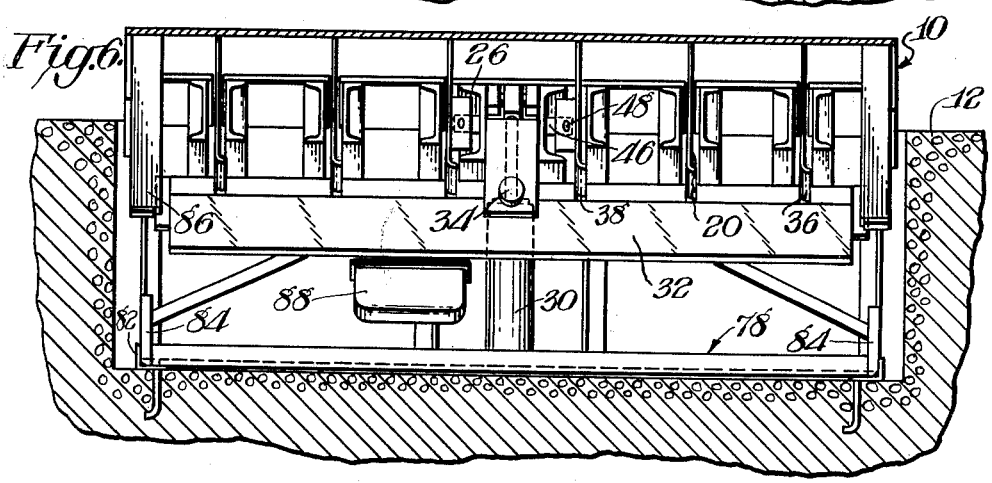
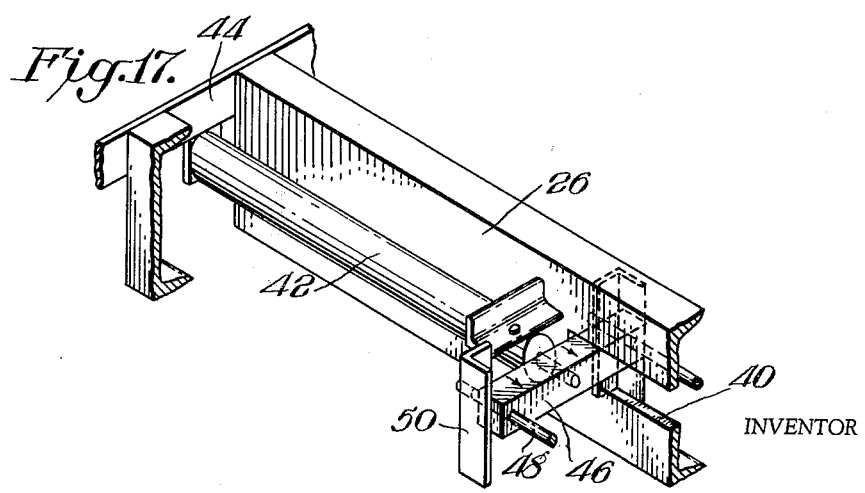
INVENTOR
Robert D. Lambert
BY Connolly and Hutz
ATTORNEYS April 27, 1965   R. D. LAMBERT   3,179,968
POWER-OPERATED LOADING RAMP
Filed Aug. 20, 1962   7 Sheets-Sheet 5
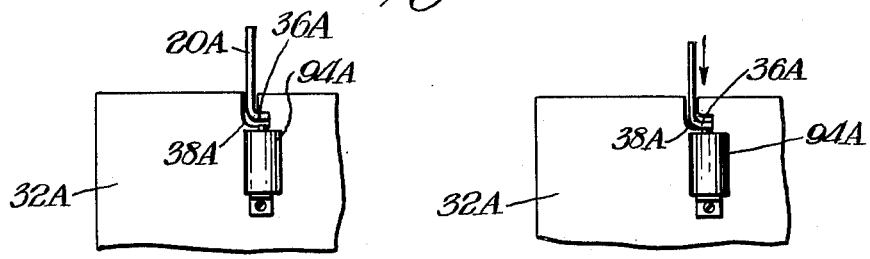
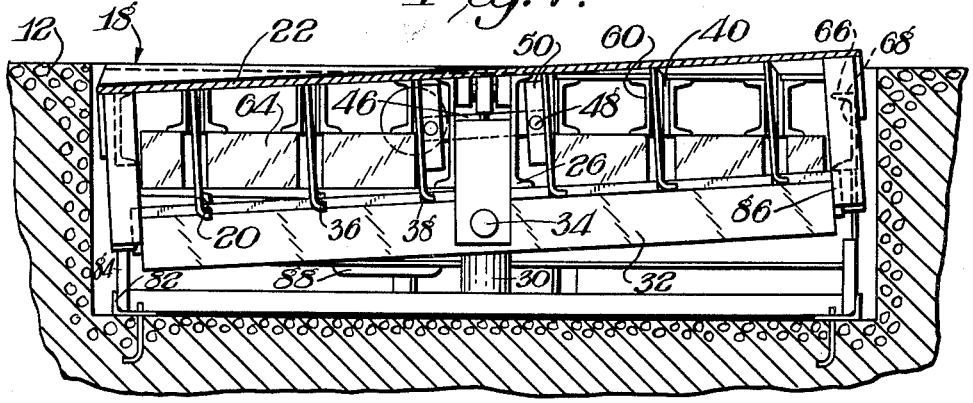
INVENTOR
Robert D Lambert
BY Connolly and Hutz
ATTORNEYS

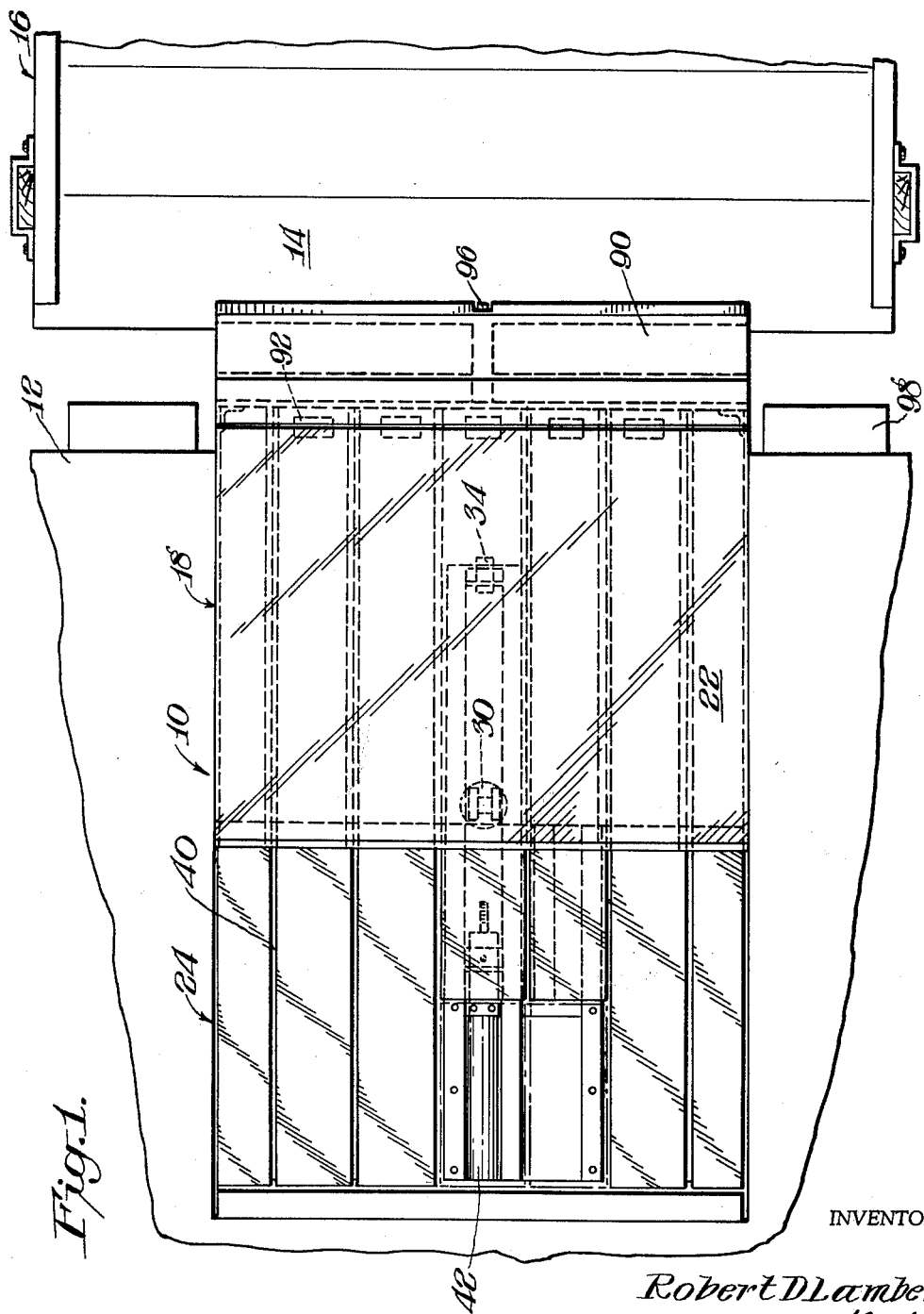

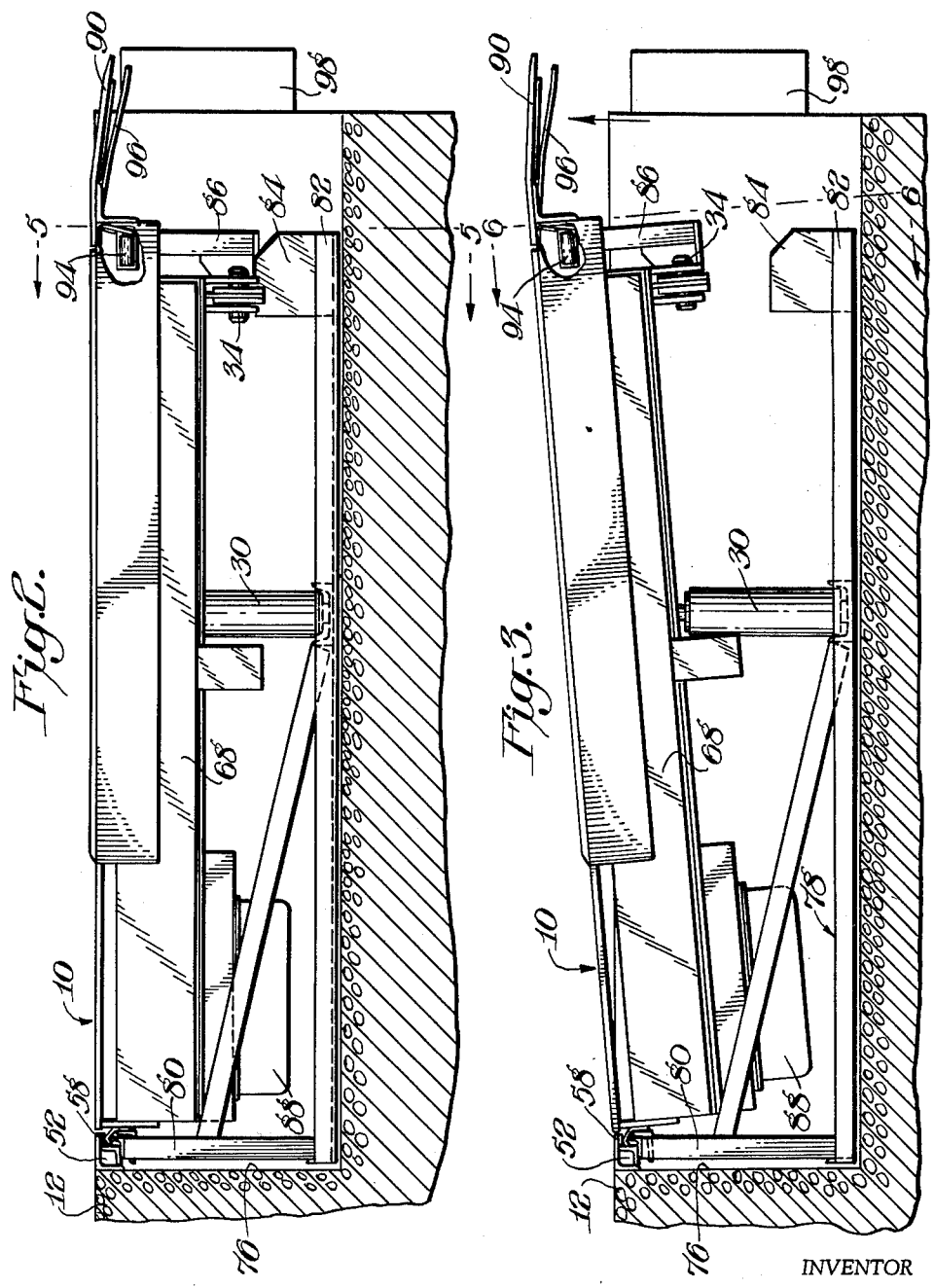

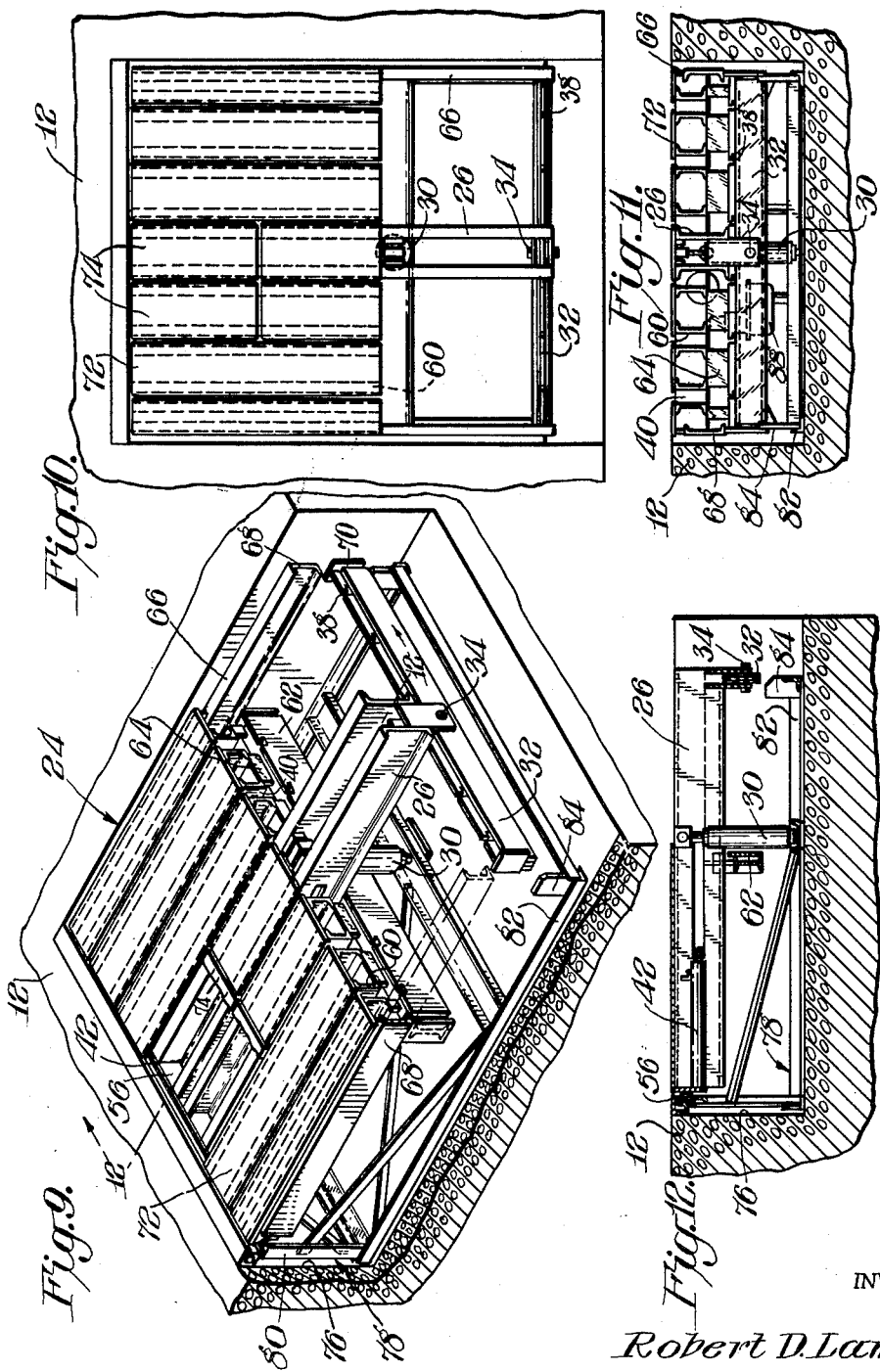

April 27, 1965 R. D. LAMBERT 3,179,968
POWER-OPERATED LOADING RAMP
Filed Aug. 20, 1962 7 Sheets-Sheet 7
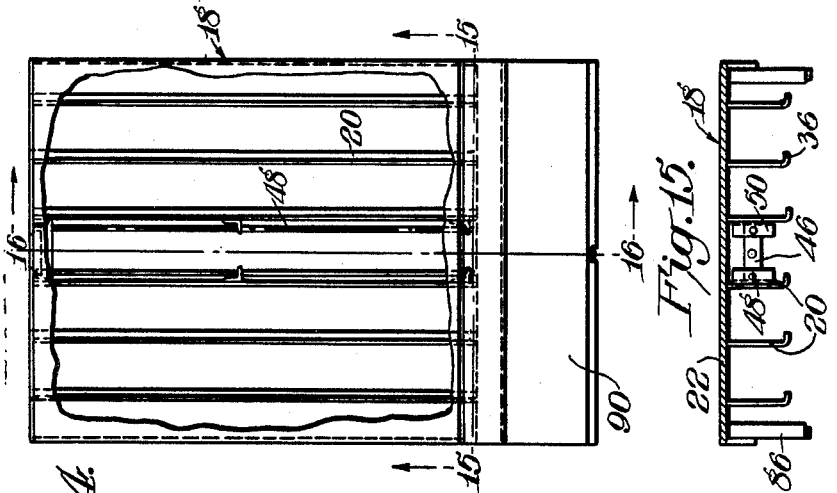
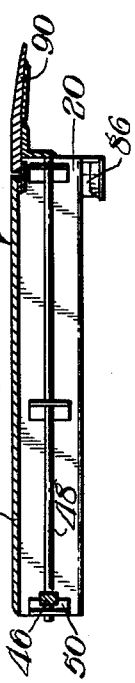
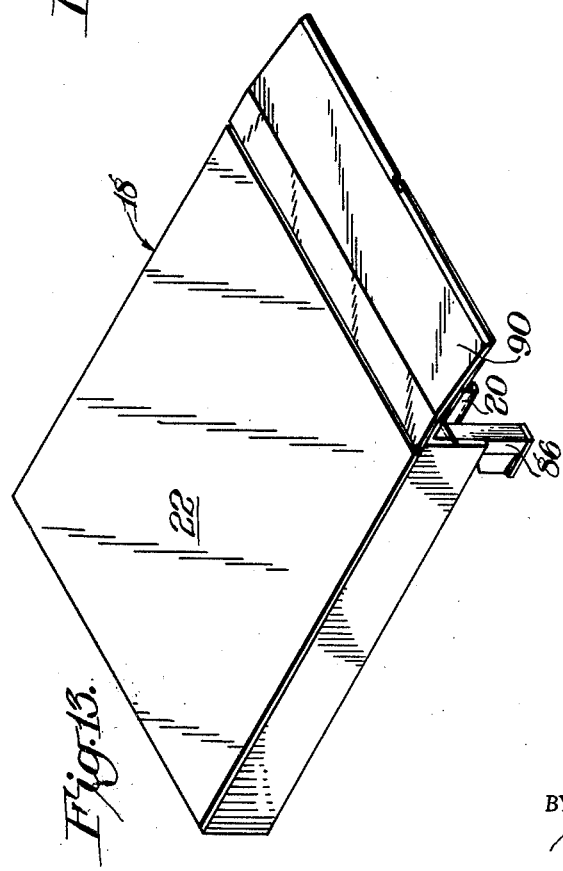
INVENTOR
Robert D. Lambert
BY Connolly and Hutz
ATTORNEYS

United States Patent Office 3,179,968
Patented Apr. 27, 1965

3,179,968
POWER-OPERATED LOADING RAMP
Robert D. Lambert, Fort Wayne, Ind., assignor to Symington Wayne Corporation, Salisbury, Md., a corporation of Maryland
Filed Aug. 20, 1962, Ser. No. 217,850
9 Claims. (Cl. 14—71)

This invention relates to a power-operated ramp for bridging the space between a loading dock and the bed of a truck parked next to it, and it more particularly relates to such a ramp which can tilt from side to side to accommodate misalignment between the surfaces of the dock and truck bed.

The beds of trucks being loaded from docks often are angularly misaligned from the horizontal level of the loading dock. It is therefore highly desirable for the surface of the ramp to twist to accommodate this misalignment with its rear end remaining in line with the loading dock and its front end conforming to the bed of the truck. Since these loading ramps are made of a relatively strong structural material such as steel for carrying the substantial loads transferred across it including the weight of loading vehicles such as fork lift trucks and the loads that they carry, it is quite difficult to provide an economical and dependable structure that accommodates the twisting action that the misalignment of its front and rear ends causes.

An object of this invention is to provide a dependable and economical structure for a power-operated ramp for a loading dock that accommodates substantial angular misalignment between its front and rear ends.

Another object of this invention is to provide such a ramp which is elevated and extendable by power.

In accordance with this invention a power-operated ramp for a loading dock includes a platform section having a number of parallel longitudinal stringers secured under a relatively flexible deck. The rear of the platform section is anchored to the edge of the loading dock, and a central longitudinal beam under it is raised and lowered by power-operated elevating means. A rocking beam is rotatably mounted upon the front of the central beam, and it is loosely engaged with the lower ends of the stringers of the platform section to cause them to remain substantially parallel to each other as they move up and down relative to each other to permit the front end of the platform to tilt from side-to-side relative to its rear end. This permits the front end of the platform to remain in contact with a truck bed which is angularly displaced from the surface of the loading dock.

A ramp of this type may be made extendable by engaging the rear of the platform in sliding relationship with a rear platform supporting section having slots within which the longitudinal stringers of the platform move back and forth. The central longitudinal beam may be secured to the longitudinal centerline of the platform supporting section, which may also include side extensions which limit the upward and downward tilting movement of the rocking beam. A power-operated extending means may be mounted within the central longitudinal beam to react between the supporting and platform sections for extending and retracting the ramp. A switch which is actuated when the lip of the platform rests upon a truck bed may be advantageously used to inactivate the power-operated elevating means and cause it to float when the ramp is so supported. The supporting platform section may be somewhat flexibly constructed to permit a degree of twist for supplementing the angle of tilt provided by the platform section.

Novel features and advantages of the present invention will become apparent to one skilled in the art from a reading of the following description in conjunction with the accompanying drawings wherein similar reference characters refer to similar parts and in which:

FIG. 1 is a plan view of one embodiment of this invention;

FIGS. 2–4 are side views in elevation of the embodiment shown in FIG. 1 in various phases of elevation and extension;

FIGS. 4A and 4B are enlarged side views in elevation of the hinges shown in FIGS. 2–4;

FIGS. 5 and 6 are cross-sectional front views in elevation taken through FIGS. 2 and 3 along respective lines;

FIG. 7 is a view similar to FIG. 5 when the front of the ramp is tilted relative to its rear;

FIG. 8 is a front view in elevation of an alternate switch arrangement for inactivating the power-operated elevated means;

FIG. 9 is a three-dimensional view of the platform supporting portion of the embodiment shown in FIG. 1;

FIGS. 10–12 are respectively top plan, front and side elevational views of the portions shown in FIG. 9;

FIG. 13 is a three-dimensional view of the platform section of the embodiment shown in FIG. 1;

FIG. 14 is a top plan view partially broken away of the portion shown in FIG. 13;

FIGS. 15 and 16 are cross-sectional views taken through FIG. 14 along respective lines; and FIG. 17 is a three-dimensional view of the portions of the power extending device of the ramp shown in FIG. 1.

In FIGS. 1–4 is shown a power-operated ramp 10 mounted upon a loading dock 12 for bridging the space between it and the bed 14 of a truck 16. Ramp 10 includes a platform 18 having a number of parallel longitudinal stringers 20 shown in FIGS. 14 and 15 which are securely under a relatively flexible deck 22, for example, made of a steel plate 1/8" thick. Since there are no lateral connections between stringers 20, the platform can flex rather easily from side-to-side.

The rear of platform 18 is connected to platform supporting section 24 which includes a central longitudinal beam 26 shown in FIGS. 9 and 10. A hinge 28 which is, for example, the continuous type, extends across the entire rear of supporting section 24 and connects the rear of ramp 10 to loading dock 12. Power-operated elevated means 30 reacts between loading dock 12 and central beam 26 portion of supporting section 24 for raising and lowering the ramp.

As shown in FIGS. 5 and 6, a rocking beam 32 is rotatably mounted by pivot 34 to the front end of central beam 26, and the lower ends 36 of stringers 20 are loosely engaged with the top of rocking beam 32 to cause them to remain parallel to each other when they move upwardly and downwardly relative to each other as later described. This loose engagement is provided by hooking the bent lower ends 36 of stringers 20 within undercut slots 38 of rocking beam 32.

Ramp 10 is an extendable form of this invention, and the rear of platform section 18 is therefore engaged to slide back and forth with respect to supporting platform section 24 to which hinge 28 is attached. Supporting section 24 therefore includes a number of longitudinal slots 40 within which stringers 20 slide back and forth upon retraction and extension of ramp 10, which is powered by cylinder 42 reacting between rear plate 44 (shown in FIG. 17) of supporting section 24 and a pusher bar 46 connected to a pair of rods 48 secured to angles 50 welded within the central pair of stringers 20 of platform 18 for moving it to and fro with respect to rear supporting section 24. The reciprocating movement of pusher bar 46 is guided within a channel 50 within beam 26, and the extension of rods 48 transmits the pusher force to the end of platform 18 thereby preventing binding upon forward and backward movement.

As shown in FIGS. 2–4, 4A and 4B, hinge 28 includes a stationary section 52 secured to the loading dock and a movable section 54 secured to bar 56 which extends across the entire rear edge of supporting platform 24. Locking bar 58 is welded within stationary hinge section 52 to prevent section 54 from disengaging.

As shown in FIG. 9, rear bar 56 connects the rear ends of longitudinal channels 60 which form the major portion of rear platform section 24, and the front ends of channels 60 are secured to stationary guide beam 62 through intermediate plates 64. Side channels 66 extend from the sides of rear platform section 24 parallel to central beam 26 with their ends 68 above and in line with the ends 70 of rocking beam 32, as shown in FIGS. 5–7 and 9, to limit the upward movement of rocking beam 32 to approximately three inches on each side. The tops of channels 60 between slots 40 are connected by longitudinal deck plates 72 to provide a slotted deck for rear platform section 24. Portions 74 of plates 72 are removable to provide access to working parts under deck plates 72. Channels 60 are otherwise unconnected laterally to each other to permit rear platform section 24 to slightly flex thereby augmenting the tilting action of the ramp. A flexing motion of approximately 1″ upward and downward upon each side can accordingly be provided.

The bottom of stationary hinge portion 52 is supported within pit 76 in loading dock 12 by supporting frame 78 including vertical rods 80 and lateral angular rods 82. A pair of stops 84 are secured to the outer ends of bars 82 for engagement by posts 86 extending downwardly from the sides at the front of platform 18 to support it in the bridging position shown in FIG. 2 flush with the top of loading dock 12.

FIGS. 2 and 3 also illustrate casing 88 incorporating the power plant including electric motor, hydraulic pump, solenoid-operated valves a reservoir and strainer and motor control as well as any other auxiliary power equipment and controls that might be necessary (all not shown).

Front platform section 18 shown in FIGS. 9–16 includes a lip 90 extending from its front edge and secured to it through a number of connecting plates 92 shown in FIG. 1. A sensing switch 94 shown in FIGS. 2 and 3 is, for example, mounted under deck 22 upon a stringer 20 with its actuating end in contact with an angular tongue 96 rotatably mounted under lip 90. Tongue 96 is actuated when lip 90 rests upon the bed 14 of a truck for causing the controls to elevating cylinder 30 to open a solenoid valve making it float thereby permitting ramp 10 to engage and conform to the inclination of the surface of truck bed 14 and to follow its movement upwardly and downwardly during the loading process.

In FIG. 8 is shown a modified arrangement of switch 94A, which is mounted upon a portion of a rocking bar 32A under an undercut slot 38A. The hooked end 36A of a strainer 20A move out of contact with switch 94A to cause the elevating cylinder to float only when lip 90 rests upon the bed 14 of a truck which holds stringer 20A raised upwardly in slot 38A away from switch 94A. When switch 94A is accordingly not contacted, it causes elevating cylinder 30 to float.

*Operation*

FIG. 2 shows ramp 10 in the crossover position with posts 86 resting upon supports 84. FIG. 3 shows ramp 10 elevated by cylinder and piston 30, and in both FIGS. 2 and 3 ramp 10 is retracted with lip 90 protected in back of buffing blocks 98 mounted on the front of loading dock 12. FIG. 4 shows platform 18 and accordingly ramp 10 extended by outward movement of cylinder and piston 42 to permit lip 90 to be dropped over a truck bed parked close to loading dock 12.

If bed 14 of truck 16 should be misaligned from the level of loading dock 12, deck 22 of platform 18 will incline to smoothly engage with truck bed 14 as illustrated in FIG. 7 to provide a smooth surface extending from loading dock 12 to truck bed 14. This inclination, illustrated in FIG. 7 will be obtained when a load is transferred across ramp 10, such as when a fork lift truck (not shown) rolls across it. Thereafter deck 22 will remain inclined by virtue of the frictional resistance within the relatively movable parts of ramp 10. As indicated in FIG. 7, rocking beam 32 is rotated in engagement with stringers 20 to maintain them parallel to each other, and the rotational movement of beam 32 about pivot 34 is limited when the end of beam 32 strikes the lower surface of side channel 68 of rear platform section 24. In a ramp of this type which is approximately six feet in width and approximately eight feet long, lip 90 can tilt approximately four inches upwardly and downwardly on each side which includes three inches provided by warping of front platform 18 including rotation of rocking beam 32 about pivot 34 and one inch provided by flexure of rear platform section 24.

What is claimed is:

1. A power-operated ramp for a loading dock comprising a platform having a number of parallel longitudinal stringers, said stringers being secured underneath a relatively flexible deck, a platform supporting section including a central longitudinal beam, the rear of said platform being connected to said platform supporting section, hinge means connecting the rear of said platform supporting section to the edge of said loading dock, power-operated elevating means reacting between said loading dock and said platform supporting section for raising and lowering said ramp, said central longitudinal beam extending under said platform section, a rocking beam rotatably mounted upon the front end of said central beam, the upper part of said rocking beam being loosely connected with the lower edges of said stringers to guide them to move proportionally up and down parallel to each other when the front end of said platform is tilted from side-to-side whereby said front end of said platform is maintained in contact with a surface upon which it rests which is angularly misaligned with said loading dock.

2. A ramp as set forth in claim 1 wherein the rear portion of said platform supporting section comprises a rear platform section to which said hinge means is attached, said rear platform section having longitudinal slots corresponding to said stringers, the upper portions of said stringers being inserted in said slots, said platform being mounted to slide back and forth upon said rear platform section with said upper portions of said stringers positioned within said slots, and power-operated extending means reacting between said rear platform section and said platform for extending and retracting said ramp.

3. A ramp as set forth in claim 2 wherein said rear platform section includes means to facilitate the twisting movement of said ramp.

4. A ramp as set forth in claim 3 wherein a stationary guide bar is secured across the front end of said rear platform section, the bottom ends of said stringers being formed into hooks, and the upper part of said guide bar and said rocking beam incorporating undercut slots for engaging the lower ends of said stringers which respectively slide within and loosely engage them.

5. A ramp as set forth in claim 4 wherein said rear platform section comprises a number of parallel channels secured to each other at their front and rear ends and relatively unconnected along their lengths to permit said rear section to accommodate a slight amount of twist, and bridging plates mounted upon the tops of said channels between said slots to provide a slotted deck for said rear platform section.

6. A ramp as set forth in claim 2 wherein said power-operated extending means is mounted within a portion of said central longitudinal beam and is disposed within said rear platform section, and said extending means reacts against a pair of said stringers of said platform section.

7. A ramp as set forth in claim 6 wherein said extending means includes a cylinder and piston rod assembly connected to said rear platform section, said cylinder and piston rod assembly being connected to a pusher bar, a longitudinal slot in said central beam, said pusher bar being mounted to slide within said slot, a pair of longitudinal rods being connected to a parallel pair of stringers of said platform extending from its front to rear, and said pusher bar being secured to said rods for transmitting its force evenly to the front and rear of said platform for minimizing bridging during its forward and backward movement.

8. A ramp as set forth in claim 2 wherein a pair of elongated structural elements are mounted on and extend from the sides of said rear platform section parallel to said central beam, and the ends of said elongated structural elements being disposed slightly above and in line with the ends of said rocking beam in its path of rocking movement for limiting said movement.

9. A ramp as set forth in claim 1 wherein said power-operated elevating means includes a control means for causing it to move upwardly and to float, said control means including sensing switch means mounted upon a portion of said ramp for inactivating said power-operated elevating means when said platform supporting section is supported on a surface to thereby cause said elevating means to float and permit said platform to engage and conform to the inclination of said surface.

References Cited by the Examiner

UNITED STATES PATENTS

| | | | |
|---|---|---|---|
| 2,547,460 | 4/51 | Hamilton | 14—71 |
| 2,585,695 | 2/52 | Snow | 14—71 |
| 2,689,965 | 9/54 | Fenton | 14—71 |
| 2,714,735 | 8/55 | Watson | 14—71 |
| 2,881,457 | 4/59 | Rodgers | 14—71 |

JACOB L. NACKENOFF, *Primary Examiner.*